US009974240B1

(12) United States Patent
Brinner et al.

(10) Patent No.: US 9,974,240 B1
(45) Date of Patent: May 22, 2018

(54) SIMULATED STONE LANDSCAPE EDGING APPARATUS (71) Applicants: Dan Thomas Brinner, Rockwell, TX (US); Carl Dennis Lynch, Dallas, TX (US)

(72) Inventors: Dan Thomas Brinner, Rockwell, TX (US); Carl Dennis Lynch, Dallas, TX (US)

(73) Assignee: EZ Concepts LLC, Rowlett, TX (US)

( * ) Notice: Subject to any disclaimer, the term of this patent is extended or adjusted under 35 U.S.C. 154(b) by 0 days. days.

(21) Appl. No.: 14/713,784

(22) Filed: May 15, 2015

Related U.S. Application Data (60) Provisional application No. 62/102,537, filed on Jan. 12, 2015.

(51) Int. Cl.
*A01G 1/08* (2006.01)

(52) U.S. Cl.
CPC .................................... *A01G 1/08* (2013.01)

(58) Field of Classification Search
CPC .............. A01G 1/08; E04H 17/1404; E04B 2002/0245; E04B 2002/0265; E04B 2002/0206; E04B 2002/023; E04B 2002/0271; E04B 2/08
See application file for complete search history.

(56) References Cited

U.S. PATENT DOCUMENTS

| | | | | |
|---|---|---|---|---|
| 2,314,481 A * | 3/1943 | Crooks | ..................... | E06B 9/52 160/398 |
| 2,662,342 A * | 12/1953 | Peterson | .................. | A01G 1/08 172/15 |
| 2,809,809 A * | 10/1957 | Johnston | ................... | A01G 1/08 256/21 |
| 3,415,013 A * | 12/1968 | Galbraith | ................. | A01G 1/08 47/33 |
| 3,537,687 A * | 11/1970 | Adelman | ............ | E02D 29/0266 160/229.1 |
| 3,706,115 A * | 12/1972 | Bleile | ...................... | E02D 17/18 411/470 |
| 4,628,632 A * | 12/1986 | Zwier | ...................... | A01G 1/08 47/33 |
| 4,768,307 A * | 9/1988 | Holowecky | ......... | A01G 13/0231 47/29.2 |
| 4,863,307 A * | 9/1989 | Jones | ..................... | E01C 11/221 404/7 |
| 4,869,018 A * | 9/1989 | Scales | .................... | A01G 27/02 47/33 |

(Continued)

*Primary Examiner* — James M Ference
(74) *Attorney, Agent, or Firm* — Law Office of Sam Sokhansanj PLLC (57) ABSTRACT

A simulated stone or masonry apparatus for landscape, lawn, or garden edging or siding is disclosed. More specifically, the simulated stone edging can be made of a durable polymer material, easy to install and remove using ground penetrating metal stakes, lightweight, weatherproof, cost-effective, and provide a visual appeal of actual stone work. In one embodiment, the landscape edging apparatus can including one or more guides, a first flexible material having a first side and a second side, wherein the first side further includes a textured faux stone surface, wherein the second side includes one or more receiving members, and wherein the receiving members are configured to receive the guides.

15 Claims, 8 Drawing Sheets

(56) References Cited

U.S. PATENT DOCUMENTS

| | | | | |
|---|---|---|---|---|
| 4,905,409 A | * | 3/1990 | Cole | A01G 1/08 47/33 |
| 4,967,522 A | * | 11/1990 | Keen | A01G 1/08 404/7 |
| 4,971,475 A | * | 11/1990 | Castonguay | E01C 11/222 404/6 |
| RE33,550 E | | 3/1991 | Jones | E01C 11/221 404/7 |
| 5,020,272 A | * | 6/1991 | Herrema | A01G 1/08 47/33 |
| 5,027,551 A | * | 7/1991 | Rodriguez | A01G 1/08 47/33 |
| 5,054,579 A | * | 10/1991 | Moson | E06C 7/46 182/107 |
| 5,092,076 A | * | 3/1992 | Terreta | A01G 1/08 47/33 |
| 5,119,587 A | * | 6/1992 | Waltz | E04H 17/1404 47/33 |
| 5,168,678 A | * | 12/1992 | Scott, Jr. | A01G 1/08 47/33 |
| 5,212,917 A | * | 5/1993 | Kurtz | A01G 1/08 404/7 |
| 5,233,806 A | * | 8/1993 | Hightower | E04H 17/1404 52/561 |
| 5,240,343 A | * | 8/1993 | Strobl, Jr. | E01C 11/221 404/7 |
| 5,259,154 A | * | 11/1993 | Lilley | A01G 1/08 404/7 |
| 5,261,760 A | * | 11/1993 | Castonguay | A01G 1/08 404/7 |
| 5,265,374 A | * | 11/1993 | Crane | A01G 1/08 256/1 |
| 5,301,461 A | * | 4/1994 | Zwier | A01G 1/08 404/7 |
| 5,375,369 A | * | 12/1994 | VerHoeve | A01G 1/08 47/33 |
| 5,377,447 A | * | 1/1995 | Fritch | A01G 1/08 404/7 |
| 5,442,877 A | * | 8/1995 | Lindhal | A01G 1/08 174/38 |
| 5,535,545 A | * | 7/1996 | Matz | A01G 1/08 239/276 |
| 5,562,288 A | * | 10/1996 | Erkebaev | A63B 69/0097 273/396 |
| 5,640,801 A | * | 6/1997 | Rynberk | A01G 1/08 404/7 |
| 5,675,930 A | * | 10/1997 | Cooper | A01G 1/08 404/7 |
| D386,265 S | * | 11/1997 | Ellington | D25/113 |
| 5,806,249 A | | 9/1998 | Helms | |
| 5,901,526 A | * | 5/1999 | Vidmar | E04H 12/2215 256/19 |
| 5,913,781 A | * | 6/1999 | Vidmar | A01G 1/08 16/223 |
| 5,921,021 A | * | 7/1999 | Coates | A01G 1/08 47/33 |
| 5,941,018 A | * | 8/1999 | Herrema | A01G 1/08 47/33 |
| 6,012,254 A | * | 1/2000 | Gaston | A01G 1/08 47/33 |
| 6,026,610 A | * | 2/2000 | Northrop | A01G 1/08 47/33 |
| 6,071,038 A | * | 6/2000 | Strobl, Jr. | E01C 11/221 404/7 |
| 6,071,044 A | * | 6/2000 | Ricciardelli | E02D 29/025 405/258.1 |
| 6,085,458 A | * | 7/2000 | Gau | A01G 1/08 47/33 |
| 6,202,367 B1 | * | 3/2001 | Marino | A01G 1/08 47/30 |
| 6,345,465 B1 | * | 2/2002 | Allen | A01G 1/08 47/33 |
| 6,389,742 B1 | * | 5/2002 | Wuster | E01C 11/222 47/33 |
| 6,772,558 B2 | * | 8/2004 | Mancini | A01C 23/027 411/470 |
| 6,854,221 B1 | * | 2/2005 | Michaels | E02D 29/025 52/102 |
| 6,944,998 B1 | * | 9/2005 | King | A01G 1/08 47/33 |
| 7,159,367 B1 | | 1/2007 | King | |
| 7,409,796 B2 | * | 8/2008 | Sacks | A01G 1/08 47/33 |
| 7,478,501 B2 | * | 1/2009 | Wilbanks, Jr. | A01G 9/12 47/33 |
| 7,941,983 B2 | * | 5/2011 | Wheeler | E04B 2/7457 52/223.9 |
| 7,966,766 B2 | | 6/2011 | Vogler et al. | |
| 8,266,844 B2 | * | 9/2012 | Kurtz | A01G 1/08 404/7 |
| 2001/0045056 A1 | * | 11/2001 | Hulett | A01G 1/08 47/33 |
| 2002/0095862 A1 | * | 7/2002 | Conde | A01G 1/08 47/33 |
| 2002/0112415 A1 | * | 8/2002 | Eakin | A01G 1/08 52/102 |
| 2004/0031221 A1 | * | 2/2004 | Girard | E04H 17/1404 52/245 |
| 2004/0144024 A1 | * | 7/2004 | Caceres | A01G 1/08 47/33 |
| 2005/0193647 A1 | * | 9/2005 | Jones | A01G 1/08 52/169.1 |
| 2008/0104896 A1 | * | 5/2008 | Strobl | E01C 11/221 52/101 |
| 2009/0013597 A1 | * | 1/2009 | Orton | A01G 1/08 47/33 |
| 2009/0016849 A1 | * | 1/2009 | Riccobene | A01G 1/08 411/496 |
| 2009/0038238 A1 | * | 2/2009 | Kurtz | A01G 1/08 52/102 |
| 2009/0056257 A1 | | 3/2009 | Mollinger et al. | |
| 2009/0062431 A1 | * | 3/2009 | Nasr | B29C 37/0032 524/8 |
| 2010/0186292 A1 | * | 7/2010 | Hall | A01G 1/08 47/33 |
| 2010/0186293 A1 | * | 7/2010 | Flynn | A01G 1/08 47/33 |
| 2012/0311927 A1 | * | 12/2012 | Bolin | A01G 1/08 47/33 |

* cited by examiner

SIMULATED STONE LANDSCAPE EDGING APPARATUS

CROSS-REFERENCE TO RELATED APPLICATION

This application claims the benefit of U.S. Provisional Application No. 62/102,537 filed on Jan. 12, 2015, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the disclosure described herein. Accordingly, it should be understood that these statements are to be read in this light, and not as admissions of prior art.

Gardeners, landscapers and homeowners frequently use border or edging material such as fences, logs, railroad ties, bricks, concrete blocks and the like to provide a decorative edge for a landscape or garden. Such border or edging material is also frequently employed to physically separate landscape, garden and other areas from one another.

Plastic landscape edging is now commonly used to divide and separate different landscape areas to preclude material in one area from spilling over into an adjacent area, and to prevent grass, flowers or the like contained in one area from growing in an adjoining area. For example, plastic edging is typically used to divide grass landscape areas from adjoining garden areas, and helps prevent grass from taking root in adjoining garden areas. Plastic edging also helps prevent garden bedding material from spilling onto the adjoining landscape area.

In the past, landscape edging has been formed from lengths of wood, corrugated metal strips, plastic, cement blocks and poured concrete. Wood is subject to rot and insect attack and decays over time. Wood landscape timbers must therefore be replaced rather frequently. Further, ungalvanized metal bands oxidize and rust, and tend to become bent and misshapen over time. Concrete and stone blocks are inflexible, difficult to install and generally heavy. Poured concrete is expensive, difficult or impossible to modify once poured and set, and difficult and time-consuming to install.

Further, the plastic or metal edging available in the market does not provide any decorative or visual appeal. Further, current edging material does now allow a user to simply install the edging material in an efficient and effective manner without requiring additional tools or more than one person or the services of professional landscape contractors.

Hence, what is needed is an edging device that is simple to use, easy to install, weatherproof, durable, lightweight, visually appealing, and cost-effective.

BRIEF SUMMARY

In particular, in one aspect of the present disclosure described herein, a method, system, and apparatus are provided for simulated stone or masonry edging apparatus that is simple to install and remove, durable, visually appealing, lightweight, and cost-effective to manufacture.

In one aspect of the present disclosure described herein, a landscape edging apparatus is provided including one or more guides, a first flexible material having a first side and a second side, wherein the first side includes a textured surface, wherein the second side further comprises one or more receiving members, and wherein the receiving members are configured to receive the guides. In addition, the second side can further include a first receiving member and a second receiving member, wherein the first receiving member has a length longer than the second receiving member. Further, the receiving members can have a tubular configuration. In addition, a second flexible material can be coupled to the first flexible material. The first flexible material can include a first receiving member and the second flexible material can include a second receiving member. Here, the first receiving member can be axially aligned with the second receiving member for receiving at least one guide disposed through both the first and second receiving members. Here, the guide can have a J-hook configuration. Further, the textured surface can be one or more of: stone, brick, masonry, and wood.

In another aspect of the present disclosure described herein, a method of assembling a landscape edging apparatus is provided. The method can include positioning a first flexible material having a textured outer surface in an upright configuration, wherein the first material further comprises a first receiving member. The method can further include positioning a second flexible material having a textured outer surface in an upright configuration, wherein the second material further comprises a second receiving member. In addition, the method can include coupling a first end of the first material to a second end of the second material, inserting a guide through the first receiving member on the first end through a second receiving member on the second end, and wherein the guide is further inserted into the earth, thereby securing the first and second flexible materials. In addition, the first end and second end can further include a dovetail coupling. In addition, the first and second flexible materials can be further assembled in a closed loop configuration. Here, the guides can have a J-hook configuration. In addition, the first end of the first material can be stacked on top of the second end of the second material. Further, the first and second receiving members can have a cylindrical tubular configuration.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The embodiments set forth below represent the necessary information to enable those skilled in the art to practice the invention and illustrate the best mode of practicing the invention. In addition, the invention does not require that all the advantageous features and all the advantages need to be incorporated into every embodiment of the invention.

Figure 1:
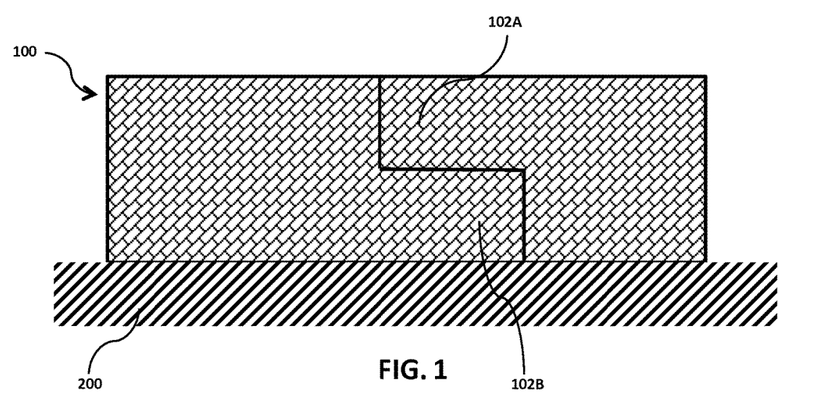
FIG. 1 illustrates a front view of an edging apparatus according to one non-limiting embodiment of the present disclosure described herein.
Figure 11:
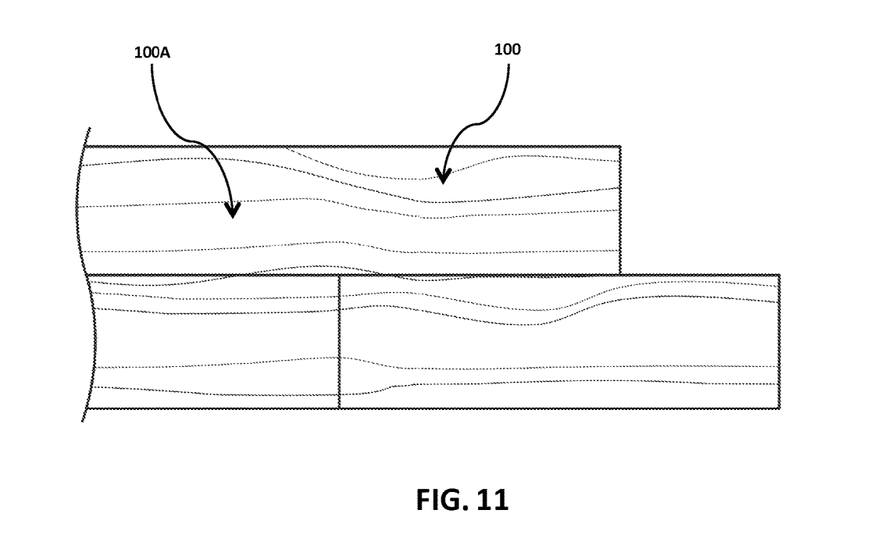
FIG. 11 illustrates a close-up front view of the edging apparatus further illustrating a simulated stone or brick surface.
Figure 12:
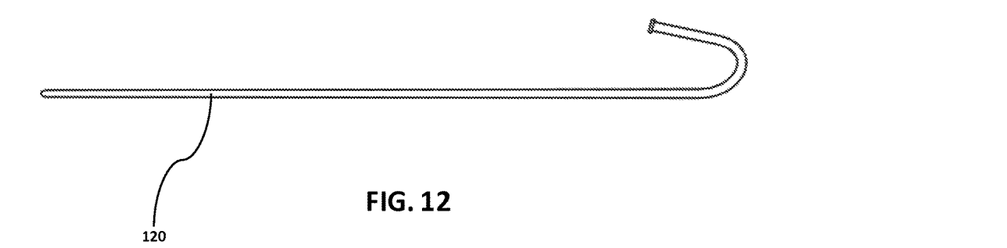
FIG. 12 illustrates a top view of the J-hook guide or locking member of the present disclosure described herein.
Figure 13:
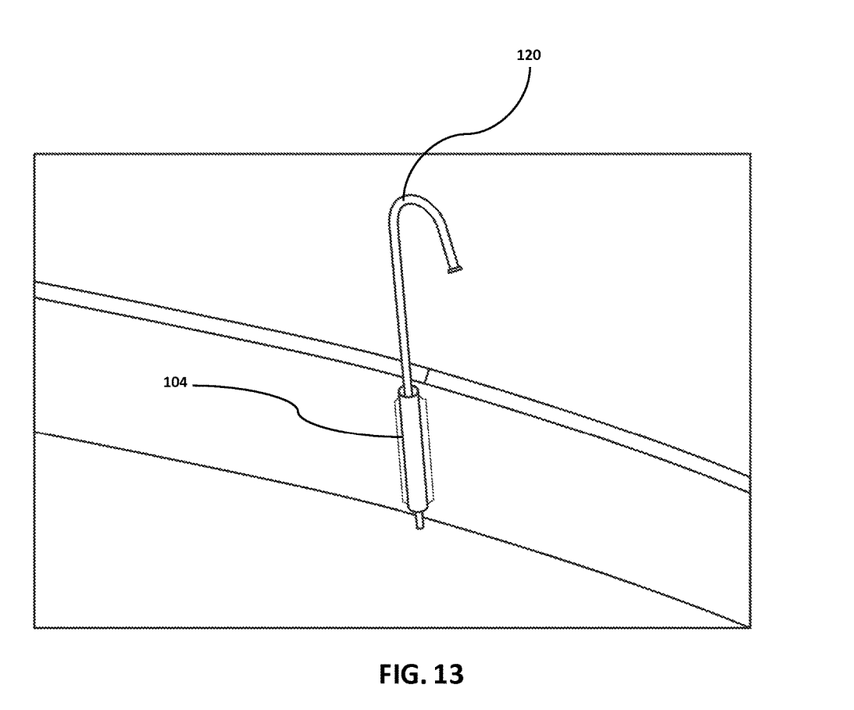
FIG. 13 illustrates a perspective rear view of the guide or locking member being guided through the female guide-receiving member.

Referring now to FIG. 1, a partial front view or exterior of the edging apparatus 100 shown wherein ends 102A and 102B are shown interlocking or joined together by dovetail. For example, in one embodiment, the apparatus 100 can be one piece (FIGS. 8-9) joined together at ends 102A and 102B. Alternatively, the edging apparatus 100 can be a plurality of modular units, modules, or apparatuses 100 joined and coupled together to form an integral unit of a plurality of edging apparatuses 100. For example, end 102A can be one unit and end 102B can be a separate unit. Here, the exterior or outer side of the edging apparatus 100 can have a variety of simulated stone, masonry, brick, concrete, or wood siding or textured surface (FIG. 11, see 100A). It is contemplated within the scope of the invention that any of the sides (interior, exterior, or top and bottom surface areas) of the edging apparatus may have a simulated or faux masonry surface or texture. In one embodiment, edging apparatus 100 can be approximately four (4) feet long, approximately six (6) inches in height and having an approximate thickness of 80 mm. However, it is contemplated within the scope of the invention that edging apparatus 100 may also have a length from one (1) feet up to 100 feet, height from two (2) inches up to ten (10) feet, and width or thickness of up to 36 inches, or any other size or dimension deemed suitable for the particular application.

Figure 2A:
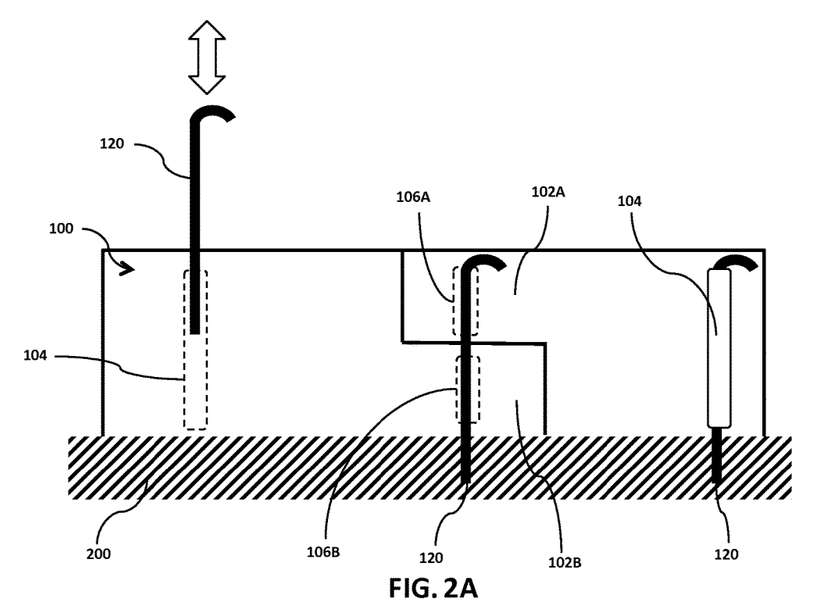
FIG. 2A illustrates a rear view of the edging apparatus of the present disclosure described herein, further illustrating a plurality of stakes, locking, or guide members.
Figure 2B:
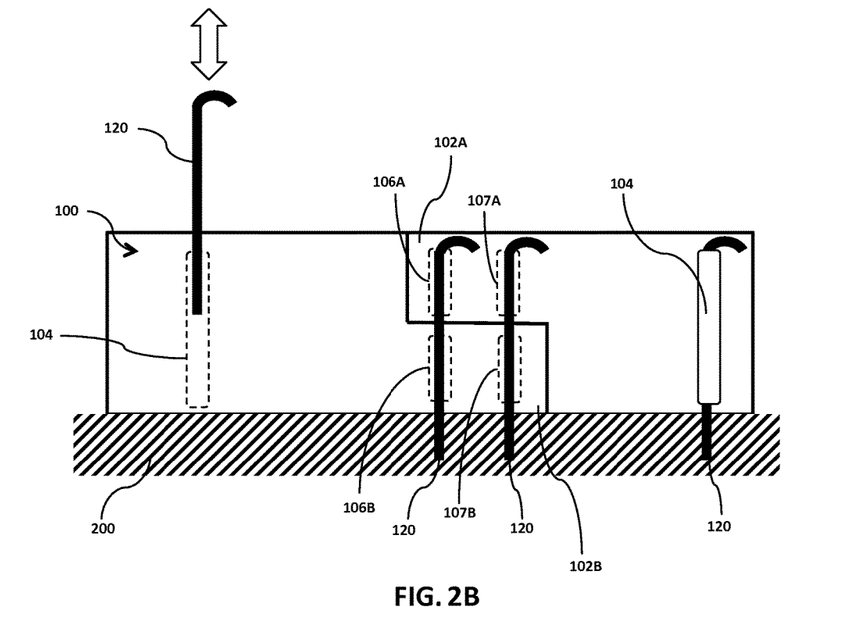
FIG. 2B illustrates a rear view of another non-limiting embodiment for the edging apparatus of the present disclosure described herein.

Referring now to FIG. 2A, a partial rear view or interior of the edging apparatus 100 is shown wherein ends 102A and 102B are joined together. More specifically, the edging apparatus comprises a plurality of stakes, locking members or J-guide members 120 that secure the apparatus 100 to the earth 200. More specifically, apparatus 100 includes a plurality of integrated guide or stake receiving channels or tubes 104 that receive members 120 there-through. Here, a user can insert guides 120 through channels or tubes 104 (and also 106A-106B) wherein guides 120 are further pushed or forced downward thereby penetrating earth 200 and securely coupling or fastening the apparatus 100 to the earth. Alternatively, the members 120 can be removed by pulling them via their J-hook and un-coupling the apparatus 100 from the earth. Here, the insertion of member 120 through integrated stake or guide receiving members, tubes, or channels 106A and 106B allow ends 102A and 102B to also be securely joined together, thereby providing a visually seamless coupling of the ends 102A and 102B when apparatus 100 is viewed from the exterior or outer surface. FIG. 2B illustrates another embodiment for apparatus 100 having additional stake or guide receiving members tubes, or channels 107A and 107B. Here, receiving members 107A and 107B also receive guides 120 therein in addition to receiving members 106A and 106B also receiving guides 120 therein, thereby providing additional stability support and a more secure connection between ends 102A and 102B. Here, guides 120 can be approximately eleven (11) inches in height and be made of galvanized steel. However, it is contemplated within the scope of the invention that the guides 120 may also be anywhere from two (2) inches up to 10 feet in length.

Figure 3:
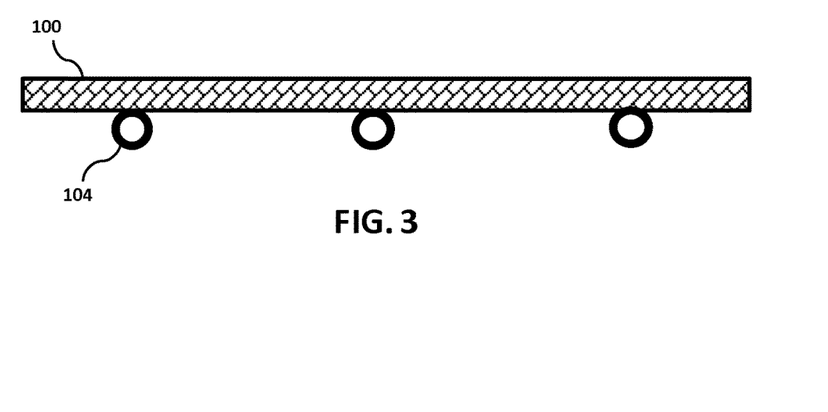
FIG. 3 illustrates a top view of the edging apparatus of the present disclosure described herein, illustrating one embodiment of cylindrical or circular female guide receiving channels or tubes.
Figure 4:
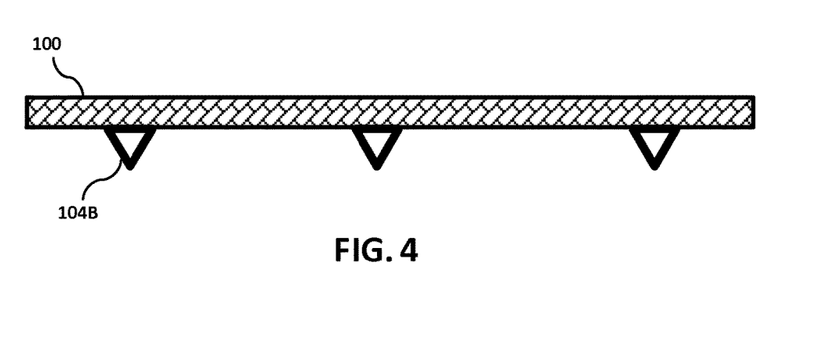
FIG. 4 illustrates a top view of the edging apparatus of the present disclosure described herein, illustrating one embodiment of triangular shaped female guide receiving channels or tubes.
Figure 5:
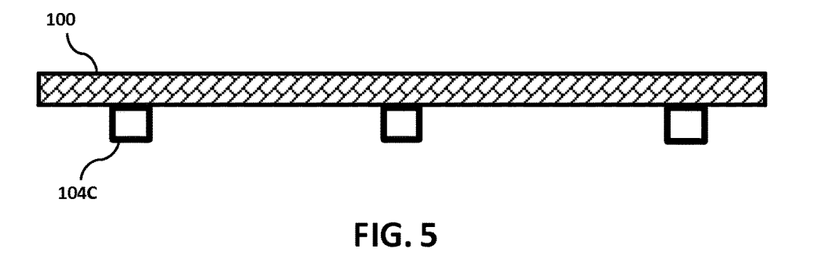
FIG. 5 illustrates a top view of the edging apparatus of the present disclosure described herein, illustrating one embodiment of square shaped female guide receiving channels or tubes.

FIGS. 3-5 illustrate top views for various embodiments for configurations of receiving members 104, 104B, 104C, wherein receiving members 106A-106B and 107A-107B can also have similar cross-section configurations as of 104, 104B, and 104C. More specifically, guide receiving members 104 can be a cylindrical or oval configuration, members 104 can be a triangular configuration, channels 104B can have a triangular configuration by with a cylindrical opening, and channels 104C can be a square like configuration. However, it is contemplated within the scope of the invention that any of channels 104 can have any shape or configuration, including but not limited to: ellipsoid, asymmetrical, or any polygon having three or more sides. Further, the tubes 104 and edging 100 can be a unitary one-piece construction mold or the tubes can be coupled, secured, or fastened to the interior portion of edging 100 via adhesives, fusion, rivets, bolts, screws, or any other fastening means. In one embodiment, the tubes 104, 106A-106B, and 107A-107B can be approximately four (4) to five (5) inches long having a ¼ to ⅜ inch outside diameter, 3/16 to 5/16 inch inside diameter, and 1/16-inch thickness, and wherein tubes 104, 106A-106B, and 107A-107B can be made of flexible or rigid PVC, PVC-C, or thermoplastic material. In addition, stakes or guides 120 can be approximately 9.5 to 11 inches long, 3/16-inch diameter, and have a slight hook or bend at one end. However, it is contemplated within the scope of the invention that the tubes or stakes may be of any length, width, thickness, dimension, or configuration.

Figure 6:
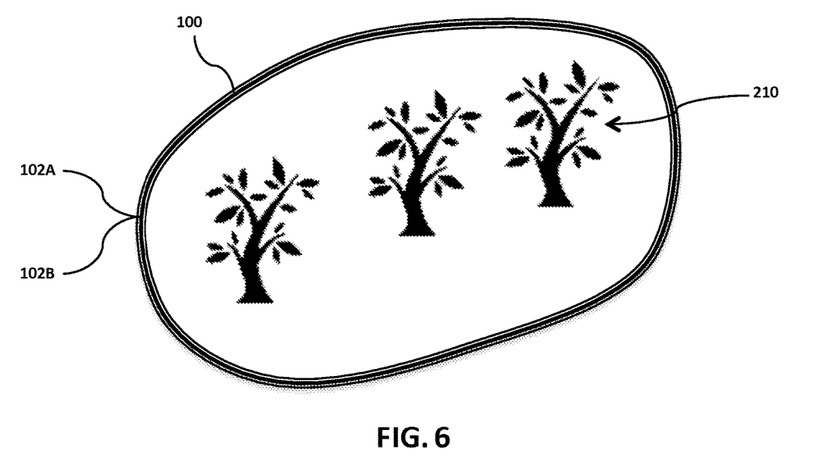
FIG. 6 illustrates an aerial view of the edging apparatus, as assembled, enclosing a garden or landscaping in a closed loop configuration.
Figure 14:
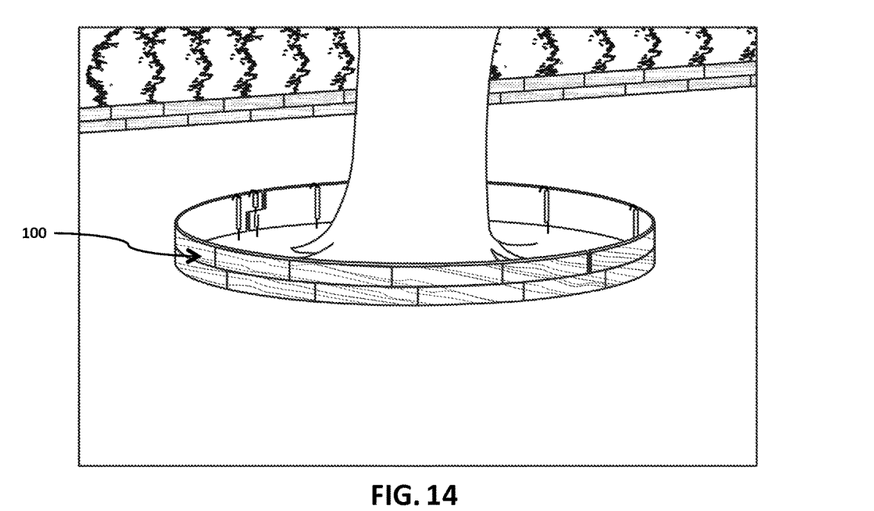
FIG. 14 illustrates a perspective view of the edging apparatus as assembled enclosing a garden or landscaping area in a closed loop configuration.
Figure 15:
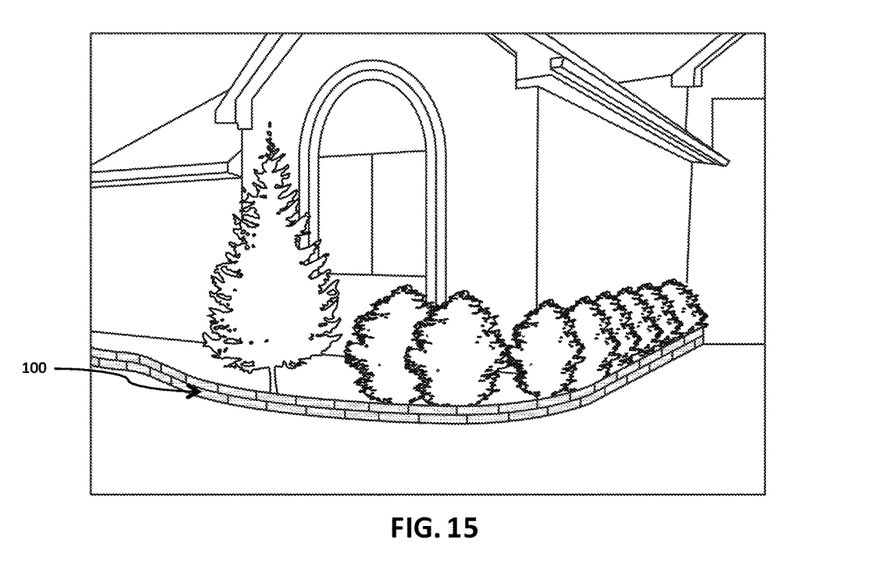
FIG. 15 illustrates a perspective view of the edging apparatus as assembled enclosing a garden or landscaping area in an open loop configuration.

FIG. 6 illustrates a top aerial view of the edging apparatus 100 as assembled enclosing landscaping 210. In this embodiment, edging apparatus can be a unitary one-piece component wherein the ends 102A and 102B join, interlock, or dovetail together (see FIGS. 1-2). In other embodiments, edging apparatus 100 can be a plurality of units or apparatuses 100 coupled together in series to form an enclosed space or closed loop configuration, as shown in FIG. 14, or an un-enclosed space or open loop configuration, as shown in FIG. 15, wherein ends 102A and 102B can terminate and join each other, as shown in FIG. 15.

Figure 7:
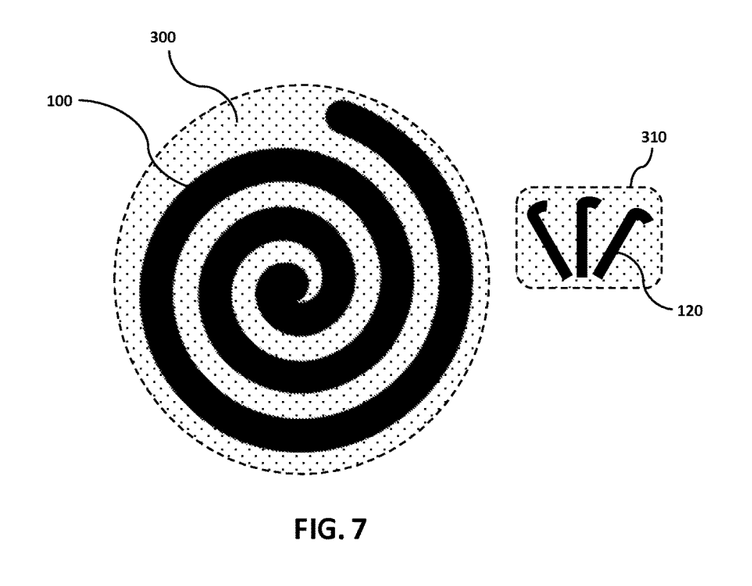
FIG. 7 illustrates a top view of the edging apparatus wound and wrapped in packaging, and the guides shown further packaged.

FIG. 7 illustrates one embodiment for packaging edging apparatus 100 of the present disclosure described herein. Here, flexible edging apparatus 100 can be rolled up in a tight manner and shrink-wrapped 300 in a vacuum sealed environment or placed within a container, bag, or receptacle. Alternatively, apparatus 100 can also be rolled in a spiral configuration and secured with one or more ties, strings, or closures. In addition, a plurality of edging apparatuses 100 may also be stacked on top of each other and packaged as two (2) to twenty (20) pieces and further shrink wrapped. In addition, stakes or guides 120 may also be shrink-wrapped 310 or placed within a container, bag, or receptacle. Alternatively, stakes or guides 120 may be fastened to apparatus 100 or its packaging 300, or alternatively placed within the packaging of apparatus 100. Here, packaged apparatus 100 can be displayed at a merchant or distributor location in a stacked configuration or may be provided as a bundle of two or more packaged apparatuses 100.

Figure 8:
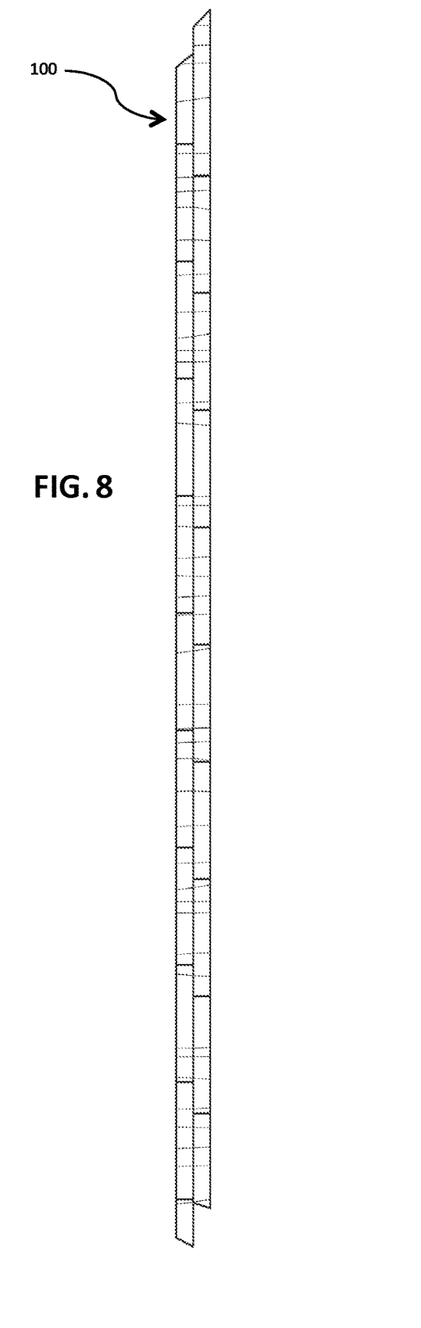
FIG. 8 illustrates a front view of the edging apparatus further illustrating a simulated stone or brick textured surface.
Figure 9:
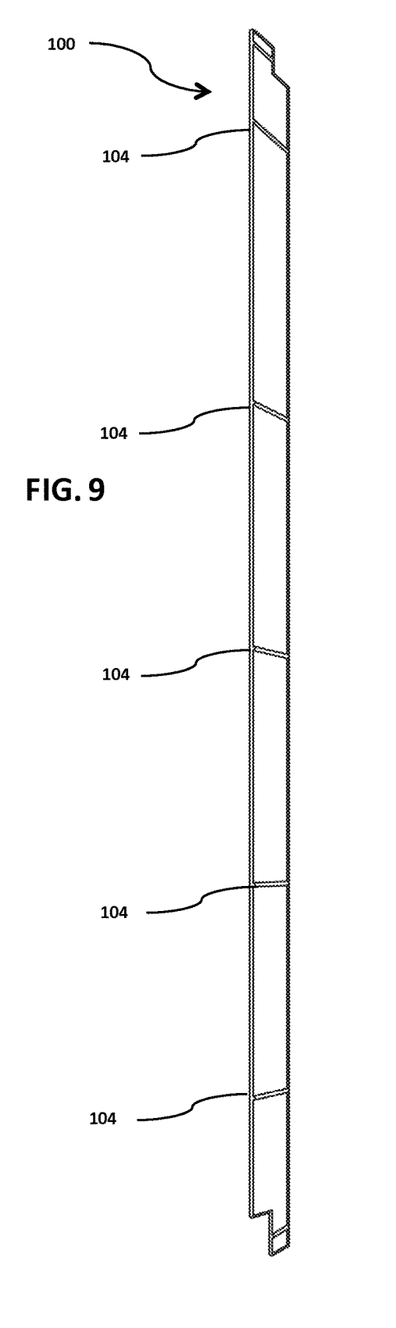
FIG. 9 illustrates a perspective rear view of the edging apparatus having a smooth surface.
Figure 10:
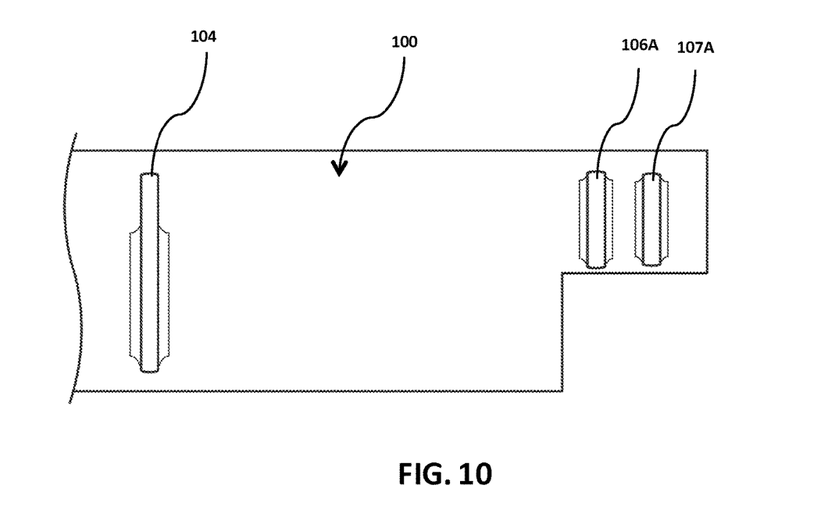
FIG. 10 illustrates a close-up rear view of the edging apparatus with the embodiment of FIG. 2B.

FIGS. 8 and 11 illustrate one embodiment for the exterior or outer surface portion of edging 100 illustrating a simulated stone, brick, or masonry surface texture. FIGS. 9 and 10 illustrate one embodiment for the interior or inside surface portion of edging 100, wherein the interior surface can be a smooth non-textured surface, or alternatively having a textured surface. In one embodiment, edging apparatus 100 can be manufactured via injection molding or spray up molding using any thermoplastic, polymer, polyurethane, or polyethylene derived material or resin. Further, the resin can include any additional fibers, composites, or coloring. In one embodiment, the edging apparatus 100 can be comprised of polyisocyanate and amine resin material. Further, in one embodiment for a method of manufacture, a mold can be pre-created from existing or actual stone, masonry, or concrete wherein the surface texture of the stone or masonry is preserved in the mold. Next, a first layer of the resin or polymer material may be sprayed or poured within the mold to a pre-defined thickness and tubes or channels 104 are placed thereon. A second and final layer of the resin (or any other material) may be sprayed or poured onto the first layer and tubes 104, thereby securing the tubes 104 to the first layer, wherein the final edging apparatus 100 is formed. The dried edging apparatus 100 may then be removed from the mold, wherein the exterior surface (or any other surface) of the apparatus takes on the texture of the mold. It is contemplated within the scope of the invention that there may any number of layers of resin to form the edging apparatus 100. Here, the edging apparatus 100 can be durable, virtually indestructible, lightweight, flexible, and visually appealing by simulating actual stone, concrete, or masonry. Further apparatus 100 may also be cut or divided into several pieces via a blade, knife, scissors, laser, or the like. In addition, given the flexible nature of apparatus 100, a plurality of apparatuses 100 can be assembled and configured either in either a straight, curved, or asymmetric configuration, among others.

It is contemplated within the scope of the invention that any other manufacturing method may also be used, including but not limited to: molding, blow molding, injection molding, extrusion molding, foam molding, laminating, and thermoforming, dip molding, rotational molding, thermoforming, laminating, foam, shrink fitting, shrink wrapping, end tube forming, forging, rolling, cold rolling, hot rolling, sheet metal rolling, impact extrusion, hemming, shearing, piercing, stamping, coining, ironing, flattening, swaging, spinning, peening, magnetic pulse, explosive forming, staking, flanging, hot metal gas forming, curling, machining, milling, turning, lathe, facing, boring, spinning, knurling, hard turning, drilling, reaming, countersinking, tapping, sawing, broaching, shaping, planning, honing, finishing, abrasive blasting, buffing, burnishing, electroplating, etching, plating, polishing, wire brushing, ultrasonic machining, electrical discharge, electron beam machining, electrochemical machining, chemical, laser cutting, grinding, gashing, adhesive bonding, epoxy bonding, thermoplastic bonding, polyurethane bonding, adhesive alloy bonding, riveting, nuts, bolts, screwing, nailing, pinning, stitching, stapling, press fitting, or three dimensional printing, or any combination thereof.

What is claimed is:
1. A landscaping edging apparatus, comprising:
   a first stake;
   a plurality of second stakes;
   a first flexible panel having a first end and a second end, and further having a first side and a second side, wherein the first side further comprises a textured simulated stone or masonry surface, and wherein the second side further comprises a smooth flat surface;
   a second flexible panel having a third end and a fourth end, and further having a third side and a fourth side, wherein the third side further comprises a textured simulated stone or masonry surface, and wherein the fourth side further comprises a smooth flat surface;
   a first tubular member secured to the second side of the first flexible panel near the first end of the first flexible panel, and a second tubular member secured to the fourth side of the second flexible panel near the third end of the second flexible panel;
   the first stake received through both the first tubular member and the second tubular member, thereby securing the first end of the first flexible panel to the third end of the second flexible panel;
   wherein the first and second tubular members each at least partially enclose the first stake;
   a plurality of third tubular members spaced apart and secured to the second side of the first flexible panel;
   a plurality of fourth tubular members spaced apart and secured to the fourth side of the second flexible panel;
   the plurality of second stakes received through the third and fourth tubular members, thereby securing the first flexible panel and the second flexible panel to the earth;

wherein the third and fourth tubular members each at least partially enclose the plurality of second stakes; and wherein the third and fourth tubular members are longer in length than the first tubular member or the second tubular member; and wherein the first tubular member and the third tubular members are secured to the first flexible panel via a resin.

2. The edging apparatus of claim 1, wherein the first end of the first flexible panel further comprises a first cut-out region having the first side and the second side.

3. The edging apparatus of claim 2, wherein the first tubular member is further secured to the second side of the first cut-out region.

4. The edging apparatus of claim 3, wherein the third end of the second tubular member further comprises a second cut-out region having the third side and fourth side, and wherein the second tubular member is further secured to the fourth side of the second cut-out region.

5. The edging apparatus of claim 4, wherein the first cut-out region of the first flexible panel is configured in a dovetail configuration with the second cut-out region of second flexible panel.

6. The edging apparatus of claim 5, wherein the first tubular member on the first cut-out region is axially aligned with the second tubular member on the second cut-out region.

7. The edging apparatus of claim 6, wherein the first cut-out region comprises at least two of the first tubular members and the second cut-out region comprises at least two of the second tubular members.

8. The edging apparatus of claim 1, wherein the first guide and the second guides are further comprised of a J-hook configuration.

9. The edging apparatus of claim 1, wherein the first flexible panel and the second flexible panel are made of a polymer.

10. A method of assembling a landscaping edging apparatus, comprising:

positioning a first flexible panel having a textured outer surface in an upright configuration, wherein the first panel further comprises a first tubular member fixed to one side of the first flexible panel and protruding from the first flexible panel, wherein the first tubular member is approximately cylindrical in shape;

positioning a second flexible panel having a textured outer surface in an upright configuration, wherein the second panel further comprises a second tubular member fixed to one side of the second flexible panel and protruding from the second flexible panel, wherein the second tubular member is approximately cylindrical in shape;

coupling a first end of the first flexible panel to a second end of the second flexible panel;

inserting a stake through the first tubular member on the first end of the first flexible panel and through the second tubular member on the second end of the second flexible panel;

wherein the stake is further inserted into the earth, thereby securing the first panel and the second panel to each other and the earth and wherein a plurality of third tubular members are dispersed and spaced apart from each other secured to the first flexible panel, wherein the third tubular members are longer in length than the first tubular member, and wherein the third tubular members each further receive the stake, thereby further securing the first flexible panel to the earth, and wherein the first tubular member and the third tubular members are secured to the first flexible panel via a resin.

11. The method of claim 10, wherein the coupled first end of the first flexible panel and second end of the second flexible panel are further comprised of a dovetail coupling.

12. The method of claim 10, wherein the first flexible panel and the second flexible panel are further assembled in a closed loop configuration.

13. The method of claim 10, wherein the stake is further comprised of a J-hook configuration.

14. The method of claim 10, wherein the first end of the first flexible panel is stacked on top of the second end of the second flexible panel, and wherein the first tubular member is axially aligned with the second tubular member and spaced apart from the second tubular member.

15. The method of claim 10, wherein the first and second tubular members are comprised of a cylindrical configuration.

* * * * *